Figure 1:
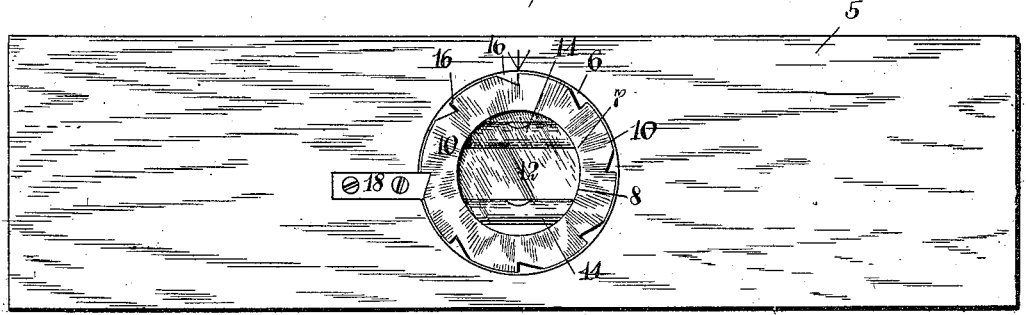

T. COUGHLIN.
LEVEL.
APPLICATION FILED JAN. 31, 1911.

1,012,987.

Patented Dec. 26, 1911.

WITNESSES
H. J. Walker
G. B. Marshall

INVENTOR
Thomas Coughlin
BY Munn & Co
ATTORNEYS

UNITED STATES PATENT OFFICE.

THOMAS COUGHLIN, OF NEW YORK, N. Y.

LEVEL.

1,012,987.  Specification of Letters Patent.  Patented Dec. 26, 1911.

Application filed January 31, 1911. Serial No. 605,757.

*To all whom it may concern:*

Be it known that I, THOMAS COUGHLIN, a citizen of the United States, and a resident of the city of New York, borough of the Bronx, in the county and State of New York, have invented a new and Improved Level, of which the following is a full, clear, and exact description.

My invention relates to levels, and it has for its object to provide a level member which may be readily secured in or moved from an opening in a frame member, means being provided for holding the level member in any one of a plurality of positions relatively to the frame member, so that the device may be used as a level, a plumb, or as a means for determining the inclination of a surface relatively to the horizontal. The level member is removable from the frame member to prevent its being injured when not in use, and its casing portions may be opened to permit of access to the inclosed spirit member.

Additional objects of the invention will appear in the following complete specification, in which the preferred form of my invention is disclosed.

In the drawings similar characters of reference indicate corresponding parts in all the views, in which—

Figure 2:
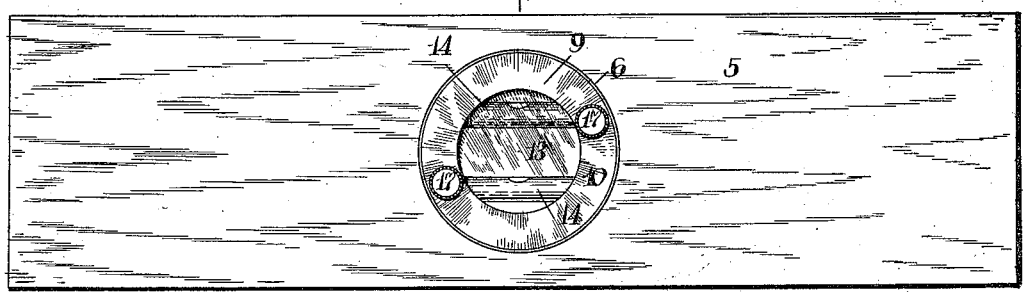
Figure 3:
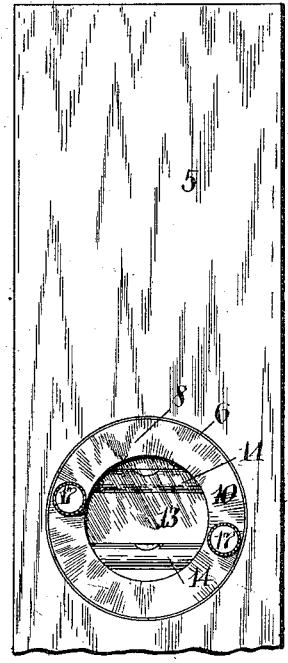

Figure 1 is a plan view of my improved level; Fig. 2 is an inverted plan view of the level; Fig. 3 is a fragmentary view showing how the level may be used as a plumb; and Fig. 4 is a sectional view on the line 4—4 of Fig. 2.

Figure 4:
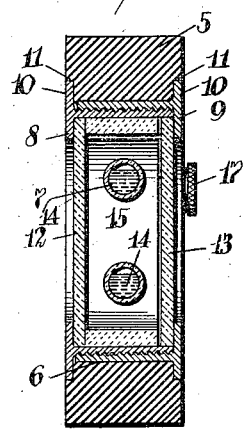

By referring to the drawings it will be seen that a frame member 5 is provided having a circular opening 6, in which the level member 7 is disposed, this level member 7 being composed of two threaded parts 8 and 9, which may be screwed together as best shown in Fig. 4 of the drawings. Each of the level parts 8 and 9 has a flange 10, the flanges 10 being adapted to rest against shoulders 11, at each side of the frame member 5, around the opening 6 therein. It will therefore be seen that the parts 8 and 9 of the level member may be inserted in the opening 6 at opposite sides of the frame member, which will cause the flanges 10 to engage the shoulders 11 and hold the level member securely in place in the opening in the frame. The part 8 of the level member has a glass end portion 12, and the member 9 of the level member has a glass end portion 13. The part 8 of the level member has disposed therein one or more spirit members 14, the spirit members being disposed parallel to each other, and being secured to opposite sides of the side wall 15 of the said part 8 of the level member. A finger 18 is secured to the frame member 5, at one side, the said finger 18 being adapted to engage any one of the several recesses 16 in the flange 10 of the part 8 of the level member. These recesses 16 are preferably disposed 45° apart, but it will be understood that they may be disposed at any predetermined distance from each other. The part 9 of the level member has thumb pieces 17, by which it may be readily rotated relatively to the frame member, and the part 8 of the level member.

When the level is not in use the level member is removed from the frame member, to prevent injury thereto. This may readily be done by rotating the part 9 by means of the thumb pieces 17. When the part 9 of the level member has been freed from the part 8 of the level member, the said parts may be removed one from each side of the frame member 5, and may be screwed together away from the frame. When it is desired to use the device, the parts of the level member are introduced in the opening 6, in the frame member 5, at opposite sides, and are screwed together, the finger 18 being disposed in one of the recesses 16, and being held in this position by screwing parts 8 and 9 of the level member together.

When it is desired to turn the level member relatively to the frame member 5, so that the spirit members 14 will be disposed in a new position relatively to the edges of the frame member 5, the part 9 of the level member is turned relatively to the part 8 of the level member which will permit of the movement of the flange 10 of the part 8 outwardly relatively to the frame member 5, to permit the level member to be rotated relatively to the frame, so that the finger 18 may be disposed in the desired recess 16. This having been done the part 9 of the level member is again rotated to hold the parts 8 and 9 of the level member together, and the finger 18 in the desired recess.

Having thus described my invention, I claim as new and desire to secure by Letters Patent:

In a level a frame member having a circular opening, a member secured to the frame member and projecting into the plane of the opening, an annular level member normally disposed in the opening and composed of two threaded parts meshing with each other, each part having a flange for engaging one of the sides of the frame member, there being a recess in the flange on one of the parts of the level member, and a spirit member carried by the last-mentioned part of the level member.

In testimony whereof I have signed my name to this specification in the presence of two subscribing witnesses.

THOMAS COUGHLIN.

Witnesses:
ALFRED RIMMER, Sr.,
ALFRED RIMMER, Jr.

Copies of this patent may be obtained for five cents each, by addressing the "Commissioner of Patents, Washington, D. C."